June 5, 1923.

F. E. EBEL

HYDRAULIC MOTOR

Filed April 29, 1921

1,457,927

INVENTOR.
Frederick E. Ebel
By W. F. Bernhard
Attorney.

Patented June 5, 1923.

1,457,927

UNITED STATES PATENT OFFICE.

FREDERICK EDWARD EBEL, OF NEW YORK, N. Y.

HYDRAULIC MOTOR.

Application filed April 29, 1921. Serial No. 465,467.

*To all whom it may concern:*

Be it known that I, FREDERICK E. EBEL, a citizen of the United States, residing at the city of New York, borough of Manhattan, county and State of New York, have invented a certain new and useful Hydraulic Motor, of which the following is a specification.

This invention is a motor operable by the head and flow of a liquid for the generation of power.

According to this invention, an endless chain of buckets or flights is supported in a novel relation to a flume through which water flows in a manner to apply pressure to said buckets or flights, whereby motion is imparted to said endless chain for turning a shaft from which power is transmitted to a machine of suitable character.

Said endless chain co-operates with a driven member and an idler member, the diameter of the driven member exceeding that of the idler member, as a result of which the lower active lead of the endless chain is inclined in the direction of flow of water within the flume, whereas the non-active lead of said endless chain is inclined from the large driven member toward the smaller idler member, whereby the motion of the endless chain itself is influenced more or less by gravity and the head and velocity of the water is utilized for the propulsion of the endless bucket chain. Said endless chain is provided with friction rollers adapted to travel upon the flume and upon suitable rails for supporting the weight of said endless chain and for minimizing the frictional contact between the chain, the idler member, the driven member, and the flume and rails.

Other functions and advantages of the invention will appear in the following description taken in connection with the accompanying drawings, wherein—

Figure 1 is an elevation partly in section of a hydraulic motor of my invention, and Figure 2 is a detail view in cross section on the line 2—2 of Figure 1.

A designates a flume inclined relatively to a source of liquid supply, B, shown as a reservoir. The reservoir and the flume are or may be of any construction approved by hydraulic engineers, but as shown the water flows from the reservoir directly into the flume under a desired head and at the volume and velocity required to impart motion to the endless chain C.

Said chain is composed of leaves or links $c$ in the form of flat plates provided with eyes $c'$ for the reception of hinge rods $c^2$, the latter extending beyond the edges of the links, see Figure 2. Said extended ends of the rods are provided with friction rolls $d$, and on the lower active side of the endless chain these rolls travel on the edges of the side walls of the flume, whereas the top non-active lead of said chain the rolls $d$ travel upon rails $d'$ of an elevated inclined track D.

The endless chain is constructed with buckets or flights E, the same being composed of metal and attached to or united with the links $c$ in a desired manner, said flights being of a desired cross sectional form.

Co-operating with the endless chain is a driven member F and an idler member G, the same being constructed and arranged to carry or support the weight of the chain and the buckets thereof and to position said chain in such relation to the flume that the buckets or flights on the lower active lead of said chain will travel within the chamber of the flume, whereby the head and velocity of the water are applied for the propulsion of the chain.

The driven member is carried by a driven shaft $f$ from which power is taken by a pulley and belt arrangement, or by other desired power transmission mechanism, said shaft $f$ being journaled in bearings supported in a suitable manner as by short posts $h$ of a suitable framework. Said driven member is in the form of a sprocket with radial spokes $f'$ and a rim $f^2$, said spokes projecting beyond the rim and the outer ends of said spokes being provided with pockets $f^3$ in which are adapted to be seated the friction rolls on the end portions of the hinge rods $c^2$ of the endless chain.

The idler member G is carried by a shaft $g$, journaled in bearings of the framework, said member G being shown as a sprocket comprising radial spokes $g'$ and a rim $g^2$ and said spokes having pockets $g^3$ for the reception of the rolls $d$ mounted on the end portions of the hinge rods $c^2$ of the endless chain. The sprocket constituting the driven member F exceeds in diameter that of the sprocket forming the idler member G, see Figure 1, and thus the upper and lower leads of the endless chain are inclined relatively to the driven and idler members. This organization is useful in my motor for the reason that the lower active lead is inclined in the direction of flow of the water within the flume, whereas the upper non-active lead or return side of the chain is inclined toward the idler member G, whereby the endless chain when in motion is influenced in part by gravity, as a result of which power is conserved by the utilization, at least partially, of the force of gravity, and this is supplemented by the head and velocity of the water flowing within the flume, the friction of the endless chain on its supporting appliances being minimized by the interposition of anti-friction rolls between the moving part and the stationary parts.

The mode of operation will be understood from the foregoing description taken in connection with the drawings. The endless chain is supported by the rolls of the hinge rods contacting with the pockets $f^3$ $g^3$, of the sprockets F G, the walls of the flume and the rails $d'$, so that the chain will move freely. The buckets or flights on the active lead of said chain travel within the flume, and water, under the required head and moving with the required velocity, flows from the reservoir within the flume so as to impinge the buckets or flights, thereby imparting motion to the endless chain. The lower lead of the chain travels in a path parallel to the flume and in the direction of flow of the water, whereas the inclination toward the idler member G of the non-active lead of said chain utilizes, in part, the gravity of the chain in aiding the motion of said chain, whereby the chain is driven by the flow of water without requiring the expenditure of any very considerable energy by the impelling fluid. Power is transmitted from shaft $f$ by any suitable means.

Having thus fully described the invention, what I claim as new and desire to secure by Letters Patent is:

1. In a hydraulic motor, the combination with a source of water supply, of an inclined flume having side walls in upstanding relation to the bottom thereof, a driven member and an idler member, the diameter of the driven member exceeding that of the idler member, an endless carrier provided with friction rolls and with buckets or flights, said carrier being arranged for said friction rolls to travel upon said upstanding walls of the flume and said carrier being supported for its bottom active lead to travel in the direction of flow of water within the flume, whereas the non-active lead of said carrier is influenced partially by gravity in the movement of the non-active lead of said carrier towards the idler member, and rails upon which rest the rollers on the non-active lead of said endless carrier.

2. In an hydraulic motor, the combination with a source of water supply, of an inclined flume having side walls in upstanding relation to the bottom thereof, a driven sprocket and an idler, said driven sprocket exceeding in diameter the idler sprocket, and an endless carrier provided with friction rolls and with flights or buckets, said friction rolls being adapted for contact with said sprockets and with the side walls of the flume, said endless carrier being supported for the lower lead thereof to have movement within the flume, in the direction of flow of water within said flume.

In testimony whereof I have hereto signed my name this 22nd day of April, 1921.

FREDERICK EDWARD EBEL.